United States Patent
Bogaert

(10) Patent No.: US 11,269,988 B2
(45) Date of Patent: Mar. 8, 2022

(54) AUTOMATED SOFTWARE APPLICATION VERIFICATION SYSTEM

(71) Applicant: GUARDSQUARE NV, Leuven (BE)

(72) Inventor: Sander Bogaert, Aalst (BE)

(73) Assignee: PNC BUSINESS CREDIT, West (GB)

( * ) Notice: Subject to any disclaimer, the term of this patent is extended or adjusted under 35 U.S.C. 154(b) by 700 days.

(21) Appl. No.: 16/235,731

(22) Filed: Dec. 28, 2018

(65) Prior Publication Data

US 2019/0205528 A1    Jul. 4, 2019

(30) Foreign Application Priority Data

Dec. 28, 2017   (EP) .................................. 17210888

(51) Int. Cl.
| | |
|---|---|
| G06F 21/52 | (2013.01) |
| G06F 11/28 | (2006.01) |
| G06F 9/448 | (2018.01) |
| G06F 8/75 | (2018.01) |
| G06F 9/30 | (2018.01) |
| G06F 21/12 | (2013.01) |
| G06F 21/64 | (2013.01) |

(52) U.S. Cl.
CPC ............... *G06F 21/52* (2013.01); *G06F 8/75* (2013.01); *G06F 9/30076* (2013.01); *G06F 9/4484* (2018.02); *G06F 11/28* (2013.01); *G06F 21/121* (2013.01); *G06F 21/64* (2013.01)

(58) Field of Classification Search
CPC ...................................................... G06F 21/52
See application file for complete search history.

(56) References Cited

U.S. PATENT DOCUMENTS

| | | | |
|---|---|---|---|
| 6,820,258 B1 * | 11/2004 | Fink ..................... | G06F 9/45525 717/158 |
| 7,882,396 B2 | 2/2011 | Bolignano et al. | |
| 2008/0177575 A1 * | 7/2008 | Higgins ................. | G16H 40/67 705/2 |
| 2011/0055638 A1 | 3/2011 | Lerouge et al. | |

(Continued)

FOREIGN PATENT DOCUMENTS

| | | |
|---|---|---|
| FR | 2864655 A1 | 7/2005 |
| WO | 2017196777 A1 | 11/2017 |

OTHER PUBLICATIONS

Extended European Search Report from EP Application No. 17210888.8, dated Jul. 6, 2018.

(Continued)

*Primary Examiner* — Jae U Jeon
(74) *Attorney, Agent, or Firm* — Workman Nydegger

(57) ABSTRACT

An automated application verification module is provided to identify one or more functions of a software application. There is added, for at least one of the identified functions, a verification prologue at the entry point of the function which does not alter the control flow of the original set of instructions of the function and/or does not change the semantics of the function when the verification prologue is executed in its entirety. There is added at least one corresponding verification prologue check to the software application, such that the verification prologue check is configured to automatically check the integrity of the corresponding verification prologue during execution of the software application.

20 Claims, 6 Drawing Sheets

(56) References Cited

U.S. PATENT DOCUMENTS

2012/0306629 A1* 12/2012 Banatre ................ G08B 13/14
340/10.42

OTHER PUBLICATIONS

"DexGuard," retrieved from https://www.guardsquare.com/en/products/dexguard on Dec. 28, 2018, 4 Pages.
"IXGuard," retrieved from https://www.guardsquare.com/en/products/ixguard on Dec. 28, 2018, 4 Pages.
"ProGuard," retrieved from https://www.guardsquare.com/en/products/proguard on Dec. 28, 2018, 4 Pages.

* cited by examiner

AUTOMATED SOFTWARE APPLICATION VERIFICATION SYSTEM

TECHNICAL FIELD

The invention concerns an automated application verification system and related computer-implemented method. More particularly it concerns a system and method to verify the integrity of a software application.

BACKGROUND

A known method for verifying the integrity of a software application makes use of checksumming. There is calculated a checksum for the software application or one or more checksums for one or more parts of the software application during a build operation. Additionally, during the build operation, there are added one or more corresponding checksum verification routines to the software application, which will be accessed when the software application is subsequently executed. As generally known, such a build operation typically involves compilation of the software code of the software application. The checksum calculated during the build operation of the software application is also referred to as the compile time or build time checksum in the context of this application.

When, subsequently, after distribution, the software application, is executed, it will at some point in time execute the checksum verification routine. The checksum verification routine will then calculate the checksum of the distributed software application or the corresponding part of the distributed software application. The checksum calculated during execution of the software application, also referred to as run-time or execution time, is referred to as the run-time checksum. The checksum verification routine will then verify the integrity of the distributed software application, this thus means of the software application at run-time, by comparing the run-time checksum with the build time checksum. If the run-time checksum matches the build time checksum, then the integrity of the distributed software application is assured. If the run-time checksum does not match the compile time checksum this is an indication the integrity of the distributed software application was compromised. This could for example mean that, after the build operation, the software application was subjected to tampering. This is also referred to as a breach of code integrity.

Such known methods for assuring integrity of the software application, however comprise several disadvantages, which lead to increasing complexity and overhead, both during build time as well as during run-time. For example, depending on the checksum granularity, the checksums for these parts of the software application have to be calculated over and over again at run-time of the software application. Checksum granularity refers to the number of parts of the software application for which a checksum is to be calculated. According to some embodiments each part of the application for which a checksum is calculated is for example a basic block of the control flow graph of the software application. The additional overhead generated by frequent execution of such checksum verification routines can be problematic on target devices with limited resources and especially on hot code paths, which for example are parts of the software application which are executed frequently or need to be executed within an acceptable time period.

Further, during the build operation of the software application, there are required at least two build steps, as the calculated compile time checksum can only be calculated when the compilation has been completed. When the application is for example distributed as an application binary, this means for example that the compile time checksum is typically patched into the compiled application binary for access by the checksum verification routine. This leads to an increase in complexity of the build process, and requires a complex, non-trivial and messy form of patching software code during or after the build operation. Additionally, such an approach is rendered impossible when the distribution of the software application requires the developer to offer the software application to an application distribution platform in an intermediate format, such that the final distributed version of the software application is generated by the application distribution platform by means of a build operation that is not under control of the application developer. In the latter case the software application in its final distributed form is not accessible to the developer, and it is not possible to calculate and/or patch the build time checksum of the software application binary as distributed by the application distribution platform. Finally, the embedded compile time checksum values are strictly bound to the protected code. The lack of influence over this data in this way puts limits on the flexibility of this anti-tampering technique and increases the risk of detectable patterns in the distributed software application, which can be exploited for tampering.

During run-time of the software application, in order to assure integrity of the distributed software application the checksum routine and the corresponding checksum must cover the distributed software application in its entirety. Even when a plurality of checksum routines and/or checksums are applied to achieve a certain level of granularity, for example respectively covering one or more basic blocks of the control flow graph of the software application, typically, known application integrity methods assure that the distributed software application is covered in its entirety to assure code integrity of the software application. Even when only one or more parts of the software application, such as for example one or more functions, or one or more basic blocks, etc. of the software application are subjected to such checksum routines, known application integrity methods need to verify these respective parts of the software application in their entirety, which means these respective functions, basic blocks, etc. in their entirety, to assure code integrity of these respective parts of the software application. As already mentioned above the embedded compile time checksum values for these parts of the software application are strictly bound to the protected code of these parts of the software application. Typically, these checksum verification routines are called intensively during run-time of the software application. In this way, the overhead imposed by the checksum routines during run-time can be problematic, especially on parts of the software code of the software application which are frequently executed and of which the efficient use of resource required for execution are critical.

A further prior art method and apparatus for dynamic executable verification is for example known from WO2017/196777A1. As described, during a build phase, there is prepended a random 16 byte function prefix to each function of the application to obfuscate, subsequently for each function there is randomly added a check function at a random location in the binary of the application, there is further generated an opaque jump table mapping between the prefix of the function and the corresponding check function, and finally there is generated a bootstrap which calls via the jump table all the check functions. As further described, it is required that the protected binary subsequently must first be activated, during which the bootstrap will call all check functions to generate a secure hash of the binary of the all the functions and store these in a secure hash table. Subsequently during run-time, all the check functions will again be called to calculate the secure hash of all the binaries of the functions during run-time and will compare these run-time hashes with the hashes of the secure hash table calculated during activation. It is thus clear that the check functions in order to protect the application binary calculate the hash of the entire binary of the function, and when all functions are protected, this is computationally equivalent to the calculation of the calculation of the hash of the entire application binary. Further, as described and clearly shown in FIG. 12 of WO2017/196777A1, such a method requires activation of the protected binary in a trusted environment in order to achieve an acceptable security level. When the protected binary is activated in an untrusted environment, which is typically the case during distribution of for example mobile apps, etc. and certainly during tampering attempts on such a protected binary, a high level of security cannot be guaranteed.

There thus remains a need for an automated application verification system and computer-implemented method which overcomes the above-mentioned drawbacks, and which is able to assure a suitable level of application integrity verification, with an increased level of efficiency and flexibility, and a decreased level of complexity and overhead, both during build time as well as compile time.

SUMMARY

In order to overcome the above-mentioned problems, according to a first aspect of the invention, there is provided an automated application verification module configured to:
  receive a software application;
  identify one or more functions of the software application;
  for at least one of the identified functions:
    in which the identified function consists of an original set comprising one or more instructions;
    add a verification prologue at the entry point of the function which does not alter the control flow of the original set of the function when the verification prologue is executed in its entirety; and
    add at least one corresponding verification prologue check to the software application, such that the verification prologue check is configured to automatically check the integrity of the corresponding verification prologue during execution of the software application.

In this way, by means of the automated application verification module, there is provided an automated software application verification system, which, during build time, achieves a decreased level of complexity, as the addition of a verification prologue does not require a dual step build operation, nor complex post compilation patching of the software application. Additionally, the addition of verification prologues and corresponding verification prologue checks is less complex and resource intensive than calculation of a compile time checksum covering the entire software application. The use of verification prologues also offers the option of increasing flexibility as during build time different embodiments of such a verification prologue can be added along with the addition of a corresponding verification prologue check. Adding the verification prologue and the corresponding verification prologue check are operations that can be easily performed in an automated way as a simple step of the compilation or building process, when for example the automated application verification module is part of, or cooperates with a compilation or build system. The addition of verification prologues and corresponding verification prologue checks can also assure application integrity verification when the software application is supplied to an application distribution platform in an intermediate format. The verification prologues and corresponding verification prologue checks can simply be added such that they are present in the software application in its intermediate format by means of the application verification module before the software application is provided to the application distribution platform and do not depend on the layout of the final compiled application. Additionally, also during run time the verification prologue check can be executed with less complexity and overhead than for example checksumming the binary of a software application. It is thus clear that when there is referred to a corresponding verification prologue check of a verification prologue, this means that this particular verification prologue check is configured to automatically check the integrity of that particular verification prologue during execution of the software application. It is further clear that in this way this particular verification prologue check is a corresponding verification prologue check of that particular verification prologue. It is further clear that there could be a one to one relationship between a verification prologue and its corresponding verification prologue check, however, as will be described in more detail below, there could also be added a plurality of corresponding verification prologue checks to the software application for checking the integrity of a single verification prologue. It is further also clear that the verification prologue check checks the integrity of only the corresponding verification prologue, and thus does not check the integrity of the entire function to which that corresponding verification prologue was added.

It has been found that, checking the integrity of the predetermined verification prologue of which the contents is known during the build operation further achieves a surprisingly high level of code integrity verification certainty. This results from the fact that the entry point of a function of the software application forms the most easily identifiable item for attempting a malicious manipulation of the software application. Most of such malicious manipulations are attempted in an automated manner by means of automatic tools, such as for example popular hooking frameworks which by means of automated pattern matching, disassembly and semantic analysis try to identify and manipulate function prologues to tamper with the control flow of a distributed software application. Such tampering is commonly referred to as a trampoline, such as known to person skilled in the art and as will be described in further detail below. After processing by the automated application verification module, the software application will comprise one or more functions with a verification prologue. When, after distribution, such a software application is tampered with in such a way that the verification prologue of the function is modified, then during run time, when the corresponding verification prologue check detects that the corresponding verification prologue was modified.

According to an embodiment, there is provided an automated application verification module, wherein the verification prologue consists of a predetermined non-empty set comprising instructions configured such that, when the set is executed in its entirety, the control flow of the original set of the function is not altered.

In this way there is no impact of an intact verification prologue on the functionality of the function of the software program during run time. It is clear that according to some embodiments this is implemented in such a way that the control flow of the function is not altered. According to some other embodiments the verification prologue could for example comprise internal jump instructions which do alter the control flow of the function, however, in such a way that the control flow of the original set of the function is not altered. It is further clear that in addition to instructions the predetermined, non-empty set could also comprise other data, bytes, etc. which are not considered instructions, as will be described in further detail below.

According to a further embodiment, there is provided an automated application verification module, wherein the verification prologue consists of a predetermined non-empty set comprising instructions configured such that, when the set is executed in its entirety, the set has no semantic effect on the function.

In this way the verification prologue has no impact on the functionality of the function of the software program during run time.

According to a further embodiment, there is provided an automated application verification module, wherein the verification prologue consists of a predetermined, non-empty set comprising one or more no operation or NOP instructions.

As such no operation instructions do not alter the program flow of the function and have no semantic effect, they are suitable instructions for use in the set of the verification prologue to be added to the function.

According to a further embodiment, there is provided an automated application verification module, wherein the verification prologue consists of a predetermined, non-empty set comprising instructions configured such that, when the set is executed with modifications or not in its entirety:
the execution of the software application is aborted;
the execution of the software application fails;
the execution of the software application continues in an erroneous way; and/or
the execution of a predetermined integrity breach function of the software application is triggered.

In this way, when the verification prologue is tampered with, for example by inserting a trampoline, the execution of the software application is compromised.

According to a further embodiment, there is provided an automated application verification module, wherein the verification prologue comprises a predetermined set comprising one or more predetermined bytes, prefixed by a predetermined jump instruction configured to jump across these predetermined bytes when executed.

In this way, at least part of the predetermined bytes can be used by the corresponding verification prologue check to verify the integrity of the verification prologue, while the jump instruction ensures that these predetermined bytes have no semantic effect and thus do not alter the control flow of the function.

According to a further embodiment, there is provided an automated application verification module, wherein the one or more predetermined bytes comprise one or more of the following:
one or more predetermined data;
one or more random bytes;
one or more invalid instructions.

As these predetermined bytes of the verification prologue are generated, for example during build time of the software application, it is clear that it is possible to generate, also during build time, a corresponding verification prologue check comprising a reference based on these predetermined bytes, such that the integrity check during execution of the software application during run time can be performed without requiring exchange of further data about the verification prologue at build time.

According to a further embodiment, there is provided an automated application verification module, wherein the verification prologue check is configured to:
upon a successful integrity check: continue the execution of the software application; and
upon a failing integrity check:
abort the execution of the software application;
continue the execution of the software application such that it fails;
continue the execution of the software application in an erroneous way; and/or
trigger the execution of a predetermined integrity breach function of the software application.

In this way it is assured that a compromised software application will not go undetected at run time.

According to a further embodiment, there is provided an automated application verification module, wherein the verification prologue check is configured to check the integrity by comparing at least a predetermined part of the verification prologue of the function as inserted at build time with the corresponding part of the function at run time.

In this way, both at build time and run time the verification prologue check can be generated and executed in a simple and efficient manner.

According to a further embodiment, there is provided an automated application verification module, wherein the verification prologue check is configured to check the integrity by comparing a predetermined checksum of the inserted verification prologue at build time with a checksum of the verification prologue as calculated during execution.

The calculation of the checksum of the verification prologue can be performed efficiently as the verification prologue is only a small part of the function and the software application, still it can provide for a reliable detection as the location at which the verification prologue check is inserted in the function, this means at the entry point of the function, is a common anchor point for attempts at compromising the software application, such as for example by inserting a trampoline. Additionally, the verification prologue, is at run time more difficult to identify for an attacker than an entire function, or the entire software application, in this way it will also be more difficult for an attacker to attempt at generating a checksum for the verification prologue, than it is for generating a checksum for an entire function or software application. This then increases the hurdle for an attacker which might attempt at using such a checksum as an identifiable pattern in an attempt to locate integrity verification functionality in the software application for subsequent modification.

According to a further embodiment, there is provided an automated application verification module, wherein the verification prologue check is configured to check the integrity by means of a decryption function in which at least part of the corresponding verification prologue is used as decryption key.

In this way the integrity check is combined with decryption in such a way that during run-time no further data needs to be exchanged, thereby leading to a strong resistance against tampering with the software application after distribution.

According to a further embodiment, there is provided an automated application verification module, wherein the verification prologue check is configured to check the integrity by means of one or more opaque predicates which comprises a predetermined evaluation of at least a part of the corresponding verification prologue.

In this way the risk that an attacker is able to locate the functionality of the verification prologue check in the software application is reduced.

According to a second aspect of the invention, there is provided a computer-implemented method of operating the automated application verification module according to the first aspect of the invention, comprising the steps of:
  receiving a software application;
  identifying one or more functions of the software application;
  for at least one of the identified functions:
    in which the identified function consists of an original set comprising one or more instructions;
    adding a verification prologue at the entry point of the function which does not alter the control flow of the original set of the function when the verification prologue is executed in its entirety; and
    add at least one corresponding verification prologue check to the software application, such that the verification prologue check is configured to automatically check the integrity of the corresponding verification prologue during execution of the software application.

It is clear that similar embodiments as described with respect to the above mentioned automated application verification module are also available with respect to its method of operation.

According to a third aspect of the invention, there is provided a computer program product comprising instructions which, when the program is executed by a computer, cause the computer to carry out the method according to the second aspect of the invention.

According to a fourth aspect of the invention, there is provided a computer-readable data carrier having stored thereon the computer program product of the third aspect of the invention; and/or a data carrier signal carrying the computer program product of the third aspect of the invention.

BRIEF DESCRIPTION OF THE DRAWINGS

Exemplary embodiments of the invention will now be described with reference to the accompanying drawings in which.

DETAILED DESCRIPTION OF EMBODIMENT(S)

Figure 1:
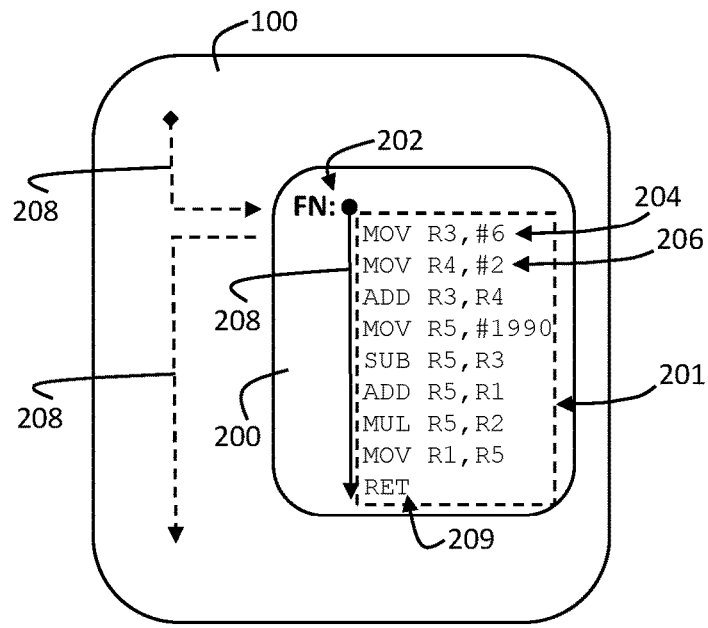
FIG. 1 schematically shows an embodiment of a function of a software application.

FIG. 1 schematically shows an embodiment of a software application 100. As shown the software application 100 comprises at least one function 200. As known to a person skilled in the art a software application 100, also referred to as an application program, an App, an application, etc. comprises a computer program typically designed to perform a group of coordinated functions 200 for execution by a processor of a suitable computing device such as for example a personal computer, a server, a smartphone, a tablet device, etc. Typically, a software application 100 thus comprises a plurality of functions 200. Such a function 200, as known to a person skilled in the art, and also referred to as a subroutine, a procedure, a routine, a method, a subprogram, etc. comprises a portion of software code of a larger software application which performs a specific task and comprises a specific portion of the software code of the software application. As generally known, such a function thus comprises a sequence of program instructions that perform a specific task, packaged as a unit. A function 200 can thus be used in a software application when that particular task should be performed. As generally known, functions may for example be defined within the application code of the software application, or alternatively in software libraries for use by the application code of the software application, or in any other suitable form. It is further clear that according to the type of programming languages, such a function of the software application 100 may be referred to as a subroutine, a procedure, a routine, a method, a subprogram, a callable unit, etc. As generally known, such a function 200 forms a step or part of the control flow of the software application 100. A function 200 is configured such that it can be started or called during execution of the software application 100. As shown in FIG. 1, typically the function 200 is called by means of a suitable identifier for the entry point 202 of the function 200, also referred to as a symbol, such as for example the function name, upon which the control flow 208 of the software application proceeds or jumps to the entry point 202 of the function 200 where the control flow 208 continues by executing the set of instructions 201 of the function 200. According to the embodiment of FIG. 1, the function 200, of which the entry point is identified by means of the function identifier "FN" when called, during execution of the software application 100, will enable the control flow 208 to proceed from the entry point 202 to the first programming instruction 204, the second programming instruction 206, etc. until it reaches the end of the set of instructions 201 of the function 200 where it will branch back, also referred to as return, at an exit point 209, such that the control flow 208 proceeds for example at the next instruction of the software application 100 following the instruction calling the function 200. It is clear that, although the set of instructions shown in the exemplary embodiment of the function 200 in FIG. 1 are for example a set of instructions comprising a sequence of assembly language instructions. Such assembly or assembler language programming instructions, are often referred to as a low-level programming language for a processor of a computer or any suitable programmable computing device. As known to a person skilled in the art there is a strong, but not necessarily one-to-one, correspondence between the assembly language human readable software code instructions and the machine readable software code instructions suitable for execution by a processor of a particular architecture, such as for example x86, arm, mips, RISC, etc. It is thus clear that the assembly language instructions can be considered a human readable representation of the corresponding machine readable instruction set suitable for execution by the processor of a computer. However, it is further clear that alternative embodiments are possible in which a function comprises any suitable set of instructions, comprising any suitable set of low level or high level instructions, machine readable and/or human readable, from any suitable low level or high level programming language and/or intermediate representation of a software application. The set of instructions of a function 200 could thus for example comprise instructions of a programming language such as C, C++, Java, Perl, byte code, bitcode, object code, etc. It is further also clear that, typically, functions 200 are called a plurality of times and/or at different places during execution of the software application. According to the embodiment shown in FIG. 1, the set of instructions comprises for example assembly language instructions for a processor comprising a RISC architecture with a 32-bit instruction size and an 8-bit address resolution. It is however clear that alternative embodiments are possible with respect to the instruction set for any suitable processor architecture.

Figure 2:
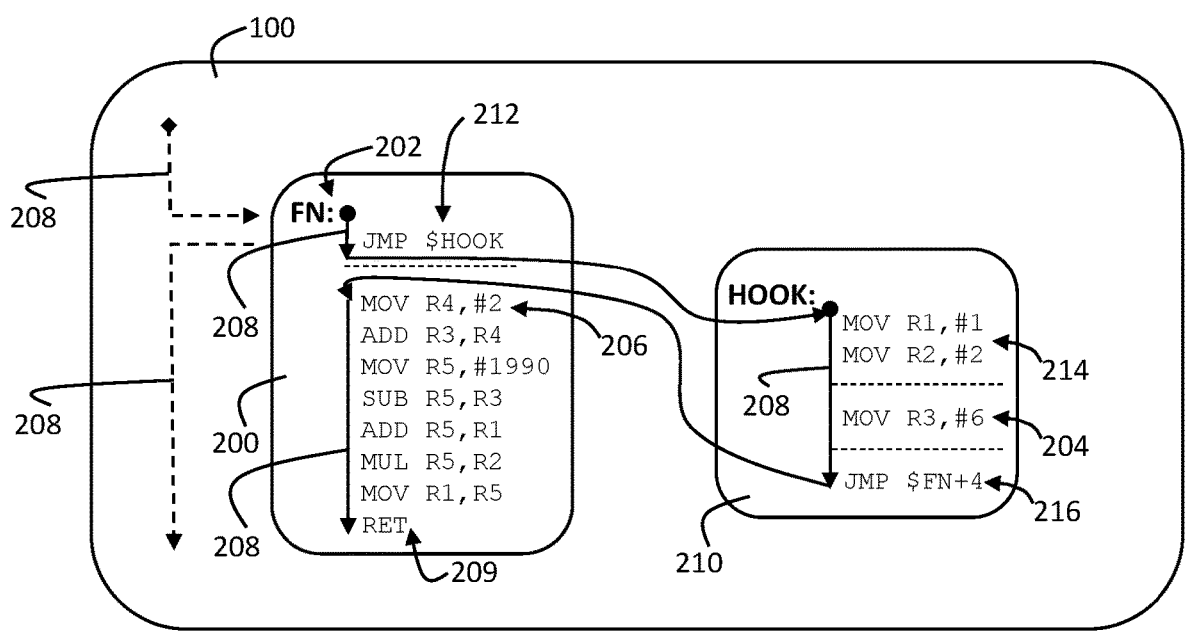
FIG. 2 schematically shows an embodiment of the function of FIG. 1 being hooked by a trampoline.

FIG. 2 shows the embodiment of the software application 100 of FIG. 1 after it was subjected to tampering by means of a hook with a trampoline on function 200 with function identifier "FN". As shown, the first instruction 204 at the entry point 202 of function 200 was overwritten with an instruction 212 which diverts the control flow 208 to some other software code, which according to this embodiment is shown as an additional function hook 210. It is clear that alternative embodiments are possible in which one or more of instructions at the entry point 202 of the function 200 are overwritten by one or more other instructions that divert the control flow 208. The instruction 212 with which the initial instructions of the function 200 are overwritten, and which divert the control flow are typically referred to as a trampoline. As known to a skilled person, the embodiment of FIG. 2 illustrates malicious manipulation of the code of the software application by means of a technique known as hooking, which intercepts and/or alters the control flow of the software application. According to the embodiment shown in FIG. 2, the trampoline 212 intercepts the function call of function 200 with function identifier "FN". It diverts the control flow 208 of this intercepted function call by means of a call to a hook function 210 with function identifier "HOOK". Such a hook function 210, comprises software code that handles and/or alters the intercepted function call is referred to as a hook. Such hooking can be used for many different purposes. However, it is typically used by automated tools for enabling tampering of distributed software applications to monitor or extract data and/or behaviour and/or to modify the control flow and/or the operation of the software application. In such a way, such a hook can be used to insert malicious code to a distributed software application, which for example monitors or alters the behaviour of a password input function or a license check function, in order to monitor the input of a password or to alter the license check function such that it deems the license always valid. According to the exemplary embodiment of FIG. 1, the hook function 210 comprises some custom code 214, which is suffixed with original first instruction 204 of the function 200 and an unconditional jump 216 to direct the control flow 208 back to proceed with the instructions following the trampoline 212 in function "FN" 200. In this way, as known to a person skilled in the art, when calling function 200 the control flow 208 is redirected by the trampoline 212 to the hook function 210 for execution of the custom code 214 and subsequently back to the function 200. The custom code 214 monitors or alters the behaviour of the function 200, and the original first instruction 204 that was replaced with the trampoline 212 is retained in the control flow 208 before the execution of the second instruction 206 of the function 200 and thus the entire set 201 of instructions of the original function 200 as shown in FIG. 1 is retained, however it is retained in a way that the control flow of the original set 201 is altered by the trampoline 212 and in which the semantics of the original set 201 is modified by the custom code 214 of the hook function 210. It is clear that, further alternative embodiments are possible, in which the control flow 208 is redirected by means of function hooking, in which for example the hooking function does not return to the original function 200, but instead returns to the call site of the original function 200, etc.

As discussed above, in order to verify the code integrity of the software application 100 by means of a checksum verification, this would require for example to calculate a suitable checksum of the entire function 200 during build time. During run time, again, a checksum would need to be calculated of the entire function 200. It is clear that, when the function 200 is subjected to tampering by means of function hooking, that the function 200 is altered by the initial instruction 204 being overwritten by the trampoline 212. It is thus further also clear that the run time checksum, when calculated at run time of the software application 100, will not match the compile time checksum of the function 200, thereby allowing to determine a breach of the code integrity of the software application 100. However as explained above calculating the checksum of the entire function 200, and typically checksums for all other components of the software application 100 both during compile time and at run time is resource intensive, inflexible and sometimes incompatible with the use of particular application distribution platforms.

Figure 3:
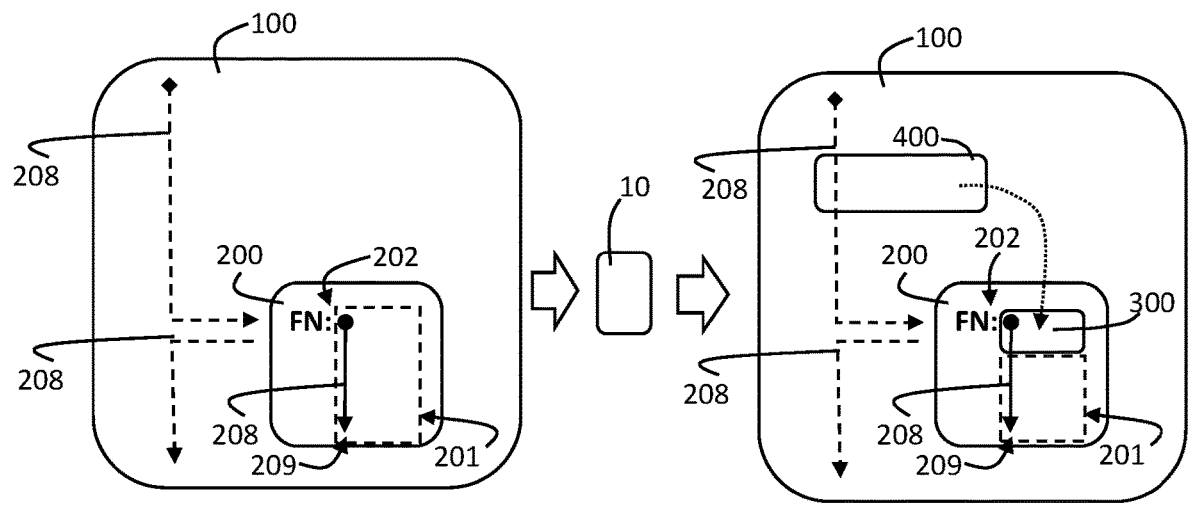
FIG. 3 schematically shows an embodiment of the automated application verification module.

FIG. 3 schematically shows an embodiment of the automated application verification module 10. As shown, the application verification module 10 receives a software application 100, for example a software application 100 similar as the embodiment shown in FIG. 1. As shown, the automated application verification module 10 identifies function 200 "FN". It is clear that application verification module 10, according to alternative embodiments will be configured to identify a plurality of functions 200 of the software application 100, and that the embodiment of FIG. 1 comprising a single function 200, is shown merely for the sake of simplicity. Such automated identification of functions 200 in a software application is well known to a man skilled in the art. According to one embodiment, there can for example be automatically generated a call graph or any other suitable automatically generated control flow graph, which represents calling relationships between a plurality of functions in a software application, in this way enabling automatic identification of functions 200 in a software application 100. It is clear that still further alternatives exist, for example for different standard libraries or Application Programming Interfaces, etc. comprising one or more functions being used by the software application, there are available suitable machine-readable definitions of the functions that are being made available to the software application. Such automated function identification in a software application can be realized by means of a suitable standalone module or tool, however it is typically functionality that is already available in a build system, for example in the compiler. It is thus clear that, although the automated application verification module 10 could be implemented as a standalone software application, it is clear that the application verification module 10 according to alternative embodiments could be a suitable module which is at least part of and/or suitably coupled to another software application, such as for example a suitable build system, a compiler, etc.

As further shown, according to the embodiment of FIG. 3, the application verification module 10 adds a verification prologue 300 to the identified function 200. As will be explained in further detail below, the verification prologue 300 comprises one or more instructions which are added at the entry point 202 of the function 200. It is thus clear that the verification prologue 300 thus comprises a non-empty subset comprising programming instructions. As will be explained in further detail below, according to some embodiments, the verification prologue 300, in addition to the programming instructions could further also comprise other data, such as for example predetermined data, random bytes, invalid instructions, etc. As will be explained in further detail below, by means of different embodiments of the verification prologue 300, in general the verification prologue 300, which is added at the entry point 202 of the function 200, does not alter the control flow of the software application 100 when executed. This generally means that, when executed, the functionality of the software application 100 will not be affected by the inserted verification prologue 300. Additionally, by inserting the verification prologue 300 at the entry point 202 of the function, it is clear that the instructions of the verification prologue 300 will be executed when the function 200 is called, as the control flow of the software application 100 is then directed to the entry point 202 of the function 200. It is clear that, as will be explained in further detail below, that the verification prologue 300, is preferably relatively small, especially, when compared to the size of the overall software application 100 and preferably also of the function 200 to which it is added. When for example the overall software application 100 comprises thousands or millions or even more lines of suitable programming instructions, the verification prologue 300 will preferably comprise a size of only a fraction thereof, for example less than 10%, preferably less than 5% or less than 1%, for example a set comprising less than one thousand instructions, for example less than one hundred instructions, which are inserted at the entry point 202 of the function 200 such that they will be executed when the function 200 is called during execution of the software application 100. In this way, as shown, the function 200 has been modified by the application verification module 10. The modified function 200 thus comprises the verification prologue 300 added at the entry point 202 of the function 200 in addition to the original set 201 comprising one or more instructions 204, 206, 209.

As further shown, according to the embodiment of FIG. 3, there is added a verification prologue check 400 to the software application 100. This verification prologue check 400 corresponds to the verification prologue 300 added to the function 200. This means that the verification prologue check 400 is added to the software application 100 in such a way that it will automatically check the integrity of the corresponding verification prologue 300 during execution of the software application 100. It is thus clear that the corresponding verification prologue check 400, similar as described above with reference to the verification prologue is added to the software application 100 by the application verification module 10 during build time of the software application 100. Subsequently, during run time of the software application, the verification prologue check 400 will at some time during the execution of the software application 100 be executed, and will thereby, as will be described in further detail below, in general check the integrity of the corresponding verification prologue 300 of the distributed software application 100. It is clear that, as already mentioned above, that alternative embodiments are possible in which for example, the application verification module 10 identifies a plurality of functions 200, and adds to a plurality of the identified functions a suitable verification prologue 300. It is clear that, according to such embodiments, for each of the added verification prologues 300 the application verification module 10 will add at least one corresponding verification prologue check 400 in a suitable way to the software application 100. It is thus clear that, according to particular embodiments, there can be added a plurality of corresponding verification prologue checks 400 checks to the software application 100 for a single corresponding verification prologue 300 of a function 200, for example in such a way that each of the plurality of verification prologue checks 400 for this corresponding verification prologue 300 are executed at different times, triggered by different events, at different places of the control flow graph of the software application, . . . during run time of the software application 100. It is further clear that, as both the verification prologue 300 and its corresponding verification prologue check 400 are added by the application verification module 10 during build time, all information needed about the verification prologue 300 to perform the functionality of the verification prologue check 400 is available to the application verification module 10 during build time. As will be explained in further detail below, the application verification module 10 can thus add the verification prologue check 400 in such a way to the software application 100 at build time that, subsequently, during run time, the verification prologue check 400 does not need any further information about the corresponding verification prologue 300 in order to check its integrity. It is further clear that, as shown in the embodiment in FIG. 3, the automated application verification module 10, in this way, also modifies the software application 100, by adding the at least one corresponding verification prologue check 400, thereby thus generating a modified software application 100 comprising the at least one corresponding verification prologue check 400 for each verification prologue 300 added to the modified functions 200 as described above. It is thus clear that in this way the automated application verification module 10, for example outputs a modified software application 100 comprising one or more modified functions 200 comprising a verification prologue 300, and further comprising at least one corresponding verification prologue check 400, for each of these modified functions 200, added to the software application 100 during build time, in such a way that during run time the verification prologue checks 400 will automatically check the integrity of their corresponding verification prologue 300. According to the embodiment shown in FIG. 3, the verification prologue check 400 is added to the software application 100 at a suitable location different from the identified function 200. It is however clear that alternative embodiments are possible, for example in which the verification prologue check 400 is at least partly comprised within a function 200 of the software application 100, within the corresponding identified function 200 comprising the corresponding verification prologue 300 of the software application 100, etc., as long as in general, the verification prologue check 400 is added to the software application 100 in such a way that it automatically checks the integrity of the corresponding verification prologue 300 during execution of the software application 100.

Figure 4:
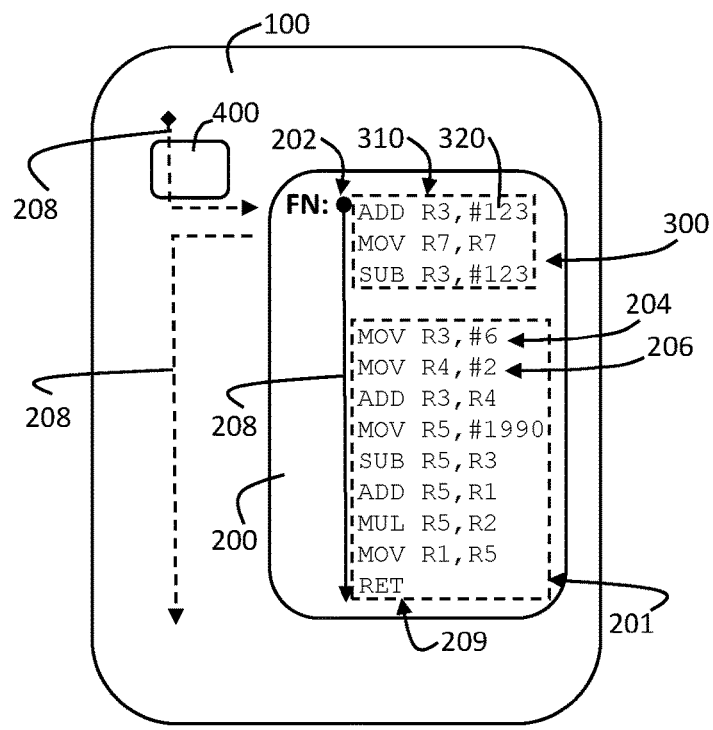
FIGS. 4-9 schematically show different embodiments of a software application outputted by the automated application verification module.

FIG. 4 shows a particular embodiment of a function 200 of a software application as modified by the application verification module 10 by adding a verification prologue 300. As shown, according to this particular embodiment the function 200 of the software application 100 is labelled with identifier "FN" similar as described above. As shown, the function 200 comprises a set of instructions 204, 206, 209, similar as shown above with reference to the embodiment of FIG. 1. As shown, according to the embodiment of FIG. 4, there is added, at the entry point 202 of function 200 "FN", a verification prologue 300. According to the embodiment shown, the verification prologue 300 consists of a non-empty set 310 of three instructions 320. According to the embodiment shown, the set 310 comprises a sequence of these three instructions:

"ADD R3, #123", which adds a value of 123 to register R3;

"MOV R7, R7", which moves the value of register R7 to register R7; and subsequently "SUB R3, #123", which subtracts the value of 123 from register R3, which thus means that the same value that was added to register R3 in the first register, is now subtracted again, thus restoring the original contents of register R3.

As shown, the verification prologue 300, is added at the entry point 202 of the function 200 "FN". According to the embodiment shown in FIG. 4, the verification prologue 300, is added at the entry point 202 as a set 310 of three instructions 320 of function 200, which precede the original first instruction 204 of the function 200. In other words, according to this embodiment, the verification prologue 300 is added to the function 200 at its entry point 202 and added in such a way that the set 310 of instructions 320 of the verification prologue 300 is followed by original set 201 of instructions of the original function 200, which comprises the initial instruction 204 and any subsequent instructions of the original function 200 of the software application 100 as received by the automated application verification module 10. According to the embodiment shown, it is clear that the verification prologue 300 does not alter the control flow 208 of the function 200, which is still proceeding, when function 200 is called from its entry point 202, via the instructions 320 of the set 310 of the verification prologue 300, to the original instructions 204, 206, ... of the function 200, to the exit point 209 of the function 200, such that the control flow 208 proceeds for example at the next instruction of the software application 100 following the instruction calling the function 200. It is thus clear that, the control flow 208 of the software application 100 is also not changed when the verification prologue 300 of the function 200 is executed in its entirety. As will be explained in further detail below, alternative embodiments are possible, for example in which the verification prologue comprises internal jump instructions which do alter the control flow, however only in such a way that the control flow of the original set 201 of the function 200 is not altered and/or the semantics of the function 200 is not altered. To an end user of the software application 100, the functionality of the software application 100 is thus not noticeably changed by the addition of the verification prologues 300 to one or more of the identified functions 200 by the application verification module 10. It is further also clear that in this way such a set 310 of instructions 320 of the verification prologue 300, when the set 310 is executed in its entirety, has no semantic effect on the function 200 or the software application 100.

Figure 7:
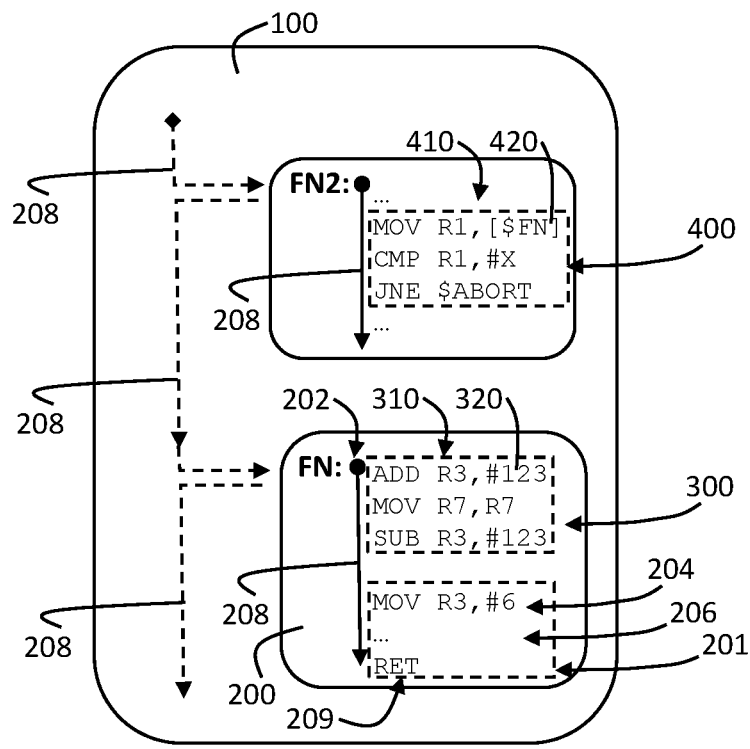

It is clear that alternative embodiments are possible, more specifically with respect to the verification prologue 300, and the set 310 of instructions 320 it comprises. According to such embodiments the set 310 could comprise a different number of instructions 320, or other types of instructions 320 than those shown in the embodiment of FIG. 4, as long as in general, the verification prologue 300, when executed in its entirety, does not alter the control flow of the function 200 to which it is added or has no semantic effect similar as explained above. One particularly useful instruction for this purpose, is for example a so called no operation instruction, also known as a NOP instruction, which is available in many high level and low-level programming languages and which is an instruction that does not perform an operation and is typically only used for example for timing purposes. Such a NOP instruction thus does not alter the control flow, nor does it have any semantic effect. Embodiments of the verification prologue 300 could thus simply be realized by providing a predetermined set 310 comprising one or more no operation or NOP instructions. According to some embodiments the verification prologue could even consist entirely of a predetermined set 310 of one or more NOP instructions. Although, according to the embodiment of FIG. 4, the verification prologue 300 does not alter the control flow of the function 200 as a whole, as will be explained in further detail below, alternative embodiments are possible, for example in which the verification prologue comprises internal jump instructions which do alter the control flow of the function 200, however only in such a way that the control flow of the original set 201 of the function 200 is not altered and/or the semantics of the function 200 is not altered According to the embodiment shown in FIG. 7, the automated application verification module 10 has added a verification prologue check 400 to the software application 100 during build time, which is for example configured to check the integrity of a corresponding verification prologue 300 similar as described above with reference to FIG. 4. According to the embodiment shown, the exemplary verification prologue check 400 is for example added to a function of the software application labelled "FN2", which for example is a different function than the function "FN" to which the corresponding verification prologue 300 was added as described above. It is however clear that alternative embodiments are possible, in which for example the verification prologue check 400 is added at any suitable location in the software application 100, even for example in the same function 200 as in which the verification prologue 300 was added, as long as in general the verification prologue check 400 is executed at a suitable moment during run time of the software application 100. In other words, the verification prologue check 400 is an executable set of instructions which is added to the control flow 208 of the software application 100 in such a way that at some suitable point in time during the execution of the software application 100, the verification prologue check 400 will be executed to check the integrity of the corresponding verification prologue 300 of the software application being executed. According to the embodiment shown in FIG. 7, the verification prologue check 400 comprises a set 410 of three instructions 420:

"MOV R1, [$FN]", which moves the first four bytes of function 200 with identifier "FN" to which the corresponding verification prologue 300 was added at build time to register R1;

"CMP R1, #X", which compares the initial four bytes of function 200 in register R1 to a predetermined value X, the value X was added at build time and corresponds to the first four bytes of the verification prologue 300 as added at build time.

"JNE $ABORT", which jumps to an abort function that aborts the execution of the software application 100, when the previous comparison shows a difference to be present between the predetermined value X that was added at build time and the actual first bytes of function 200 "FN" at run time.

It is clear that in this way the verification prologue check 400 is configured to compare at least a predetermined part of the verification prologue 300 of the function 200 "FN" as inserted at build time with the corresponding part of the function 200 "FN" at run time. According to the embodiment shown the predetermined part of the verification prologue 300 corresponded to the first four bytes of the verification prologue 300, and thus the first four bytes of the function 200 "FN". It is however clear that alternative embodiments are possible, in which for example a different predetermined part of the verification prologue 300 is checked and/or the verification prologue 300 is checked in its entirety by the corresponding verification prologue check 400. Especially when the verification prologue 300 added to a function 200 during build time is small, for example less than or equal to thirty-five instructions, preferably less than or equal to thirty instructions, preferably less than or equal to ten instructions, preferably in the range of one up to four instructions, it is clear that the verification prologue check 400 during build time could be provided with a predetermined part of or the entire verification prologue 300 itself as inserted during build time for enabling a subsequent comparison operation during run time in order to check the integrity of the function 200 to which the verification prologue 300 was added. It is clear that still further alternative embodiments are possible, specifically with respect to the number of instructions mentioned above, however it is clear that a smaller number of instructions will result in a higher level of efficiency. It is thus clear that, the verification prologue 300 as added to the identified function 200 during build time thus comprises a set 310 of instructions 320, which can for example be represented or converted to a suitable sequence of machine readable instructions 320 as present in the distributed software application 100. This sequence of machine readable instructions 320, also known as machine language instructions or machine language code, comprises a suitable machine-readable sequence of bytes representative of the instructions 320. It is clear that, in this way, the verification prologue 300 as added to the function 200 during build time can be represented as a suitable sequence of bytes, or any other suitable data structure, and added in this way during build time to a corresponding verification prologue check 400 for enabling the subsequent integrity check during run time. Similar as explained above, in this way, during run time, the verification prologue check 400 is able to compare the corresponding part of the function 200, for example the first four bytes of function 200, with the predetermined part of the verification prologue 300 of the function 200 as inserted at build time, for example in the form of a suitable data structure storing the four first bytes of the corresponding verification prologue 300 as added to the function 200 during build time. This comparison performed during run time by the verification prologue check 400, thus consists of comparing the predetermined part of the verification prologue 300 as already available to the verification prologue check 400, for example in the form of a predetermined byte sequence added during build time as described above, with the corresponding predetermined byte sequence of the function 200 as present during run time of the distributed software application 100. In this way the verification prologue check 400, at run time, only requires a simple retrieval of a few bytes corresponding to at least a part of the corresponding verification prologue 300 of the function 200 to enable an automatic check of the integrity of the corresponding verification prologue 300 during execution of the software application 100. It is clear that in this way the integrity check can be performed in an efficient way at run time, without requiring complex operations both at build time and at run time, without the need for distribution of or retrieval of external data to enable the integrity check, etc.

Figure 5:
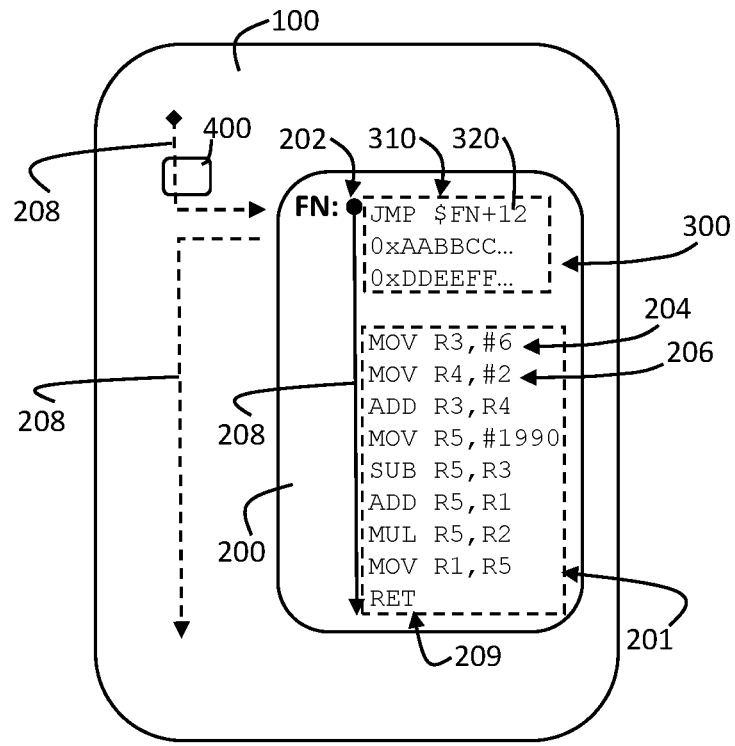

A further embodiment of a verification prologue 300 as added to an identified function 200 by the automated application verification module 10 is shown in FIG. 5. As shown, according to this particular embodiment, similar as described above with reference to FIG. 4, the function 200 of the software application 100 is labelled with identifier "FN". Similarly, the function 200 comprises a set of instructions 204, 206, 209, similar as shown above with reference to the embodiment of FIG. 1. Similar as described with reference to the embodiment of FIG. 4, there is added, at the entry point 202 of function 200 "FN", a verification prologue 300. According to the embodiment shown in FIG. 5, the verification prologue 300 consists of a non-empty set 310 of three instructions 320. According to the embodiment shown, the set 310 comprises a sequence of one instruction 322 followed by two data elements 324, each comprising four bytes:

"JMP $FN+12", which adds an unconditional relative jump instruction 322 to jump twelve bytes from the entry point 202 of the function 200 "FN";

"0xAABBCC . . . ", four predetermined bytes 324; and subsequently

"0xDDEEFF . . . ", four further predetermined bytes 324.

It is clear that according to the embodiment shown in FIG. 5, for the embodiment of the RISC processor with a 32 bit instruction set, that the added verification prologue 300 to the identified function 200 thus comprises twelve bytes, and that thus the initial jump instruction 322, will cause the control flow 208 of the function 200 to jump across the predetermined bytes 324 to continue execution of the function 200 at the first instruction 204 of the function 200 before addition of the verification prologue 300. It is clear that alternative embodiments are possible, as long as in general the verification prologue 300 comprises a predetermined set 310 comprising one or more predetermined bytes 324 prefixed by a predetermined jump instruction 322 configured to jump across these predetermined bytes 324 when executed. Similar as explained above with reference to the embodiment of FIG. 4, when the set 310 of the verification prologue 300 is executed in its entirety, the control flow 208 of the function 200 is not altered, and similarly the set 310 has no semantic effect on the function 200.

Figure 8:
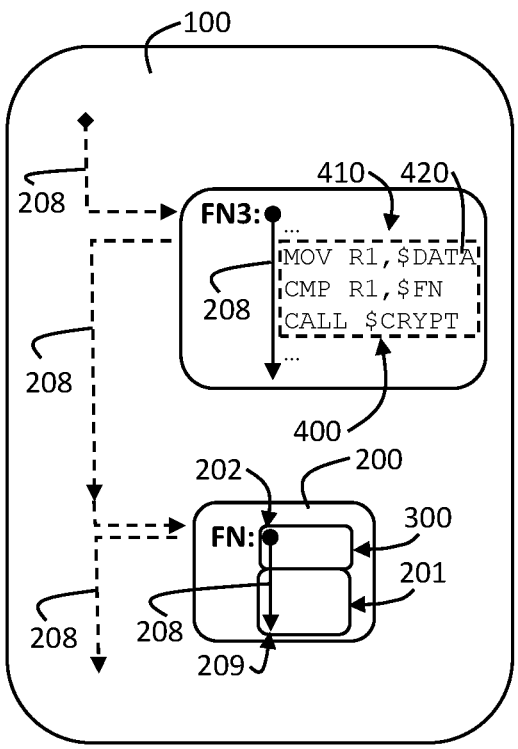

According to a particular embodiment, the corresponding verification prologue check 400, could for example function in a similar way as the embodiment shown in FIG. 8. According to the embodiment shown the verification prologue check 400, which is added to a function of the software application 100 labelled "FN3", comprises a set 410 of three instructions 420:

"MOV R1, $DATA";

"MOV R2, $FN"; and

"CALL $CRYPT", which for example calls a cryptographic function of the software application which makes use of a predetermined value of "$DATA" as available to the verification prologue check and some of the added bytes of the corresponding verification prologue 300 of function 200 "FN", as input for such a cryptographic function. Such a cryptographic function could for example function to only decrypt a predetermined part of the distributed software application, when the integrity of the part of the function 200 that is provided as input in the form of a decryption key, which corresponds to at least a part of the verification prologue 300 that was added during build time, is not compromised. According to such an embodiment, when the corresponding verification prologue 300 of the distributed application at run time was compromised and differs from the verification prologue 300 that was added to the function at build time, the verification prologue check 400 will call the cryptographic function with an input that differs from the required one, whereby for example the cryptographic function will fail to decrypt a required part of the distributed software application 100.

Figure 6:
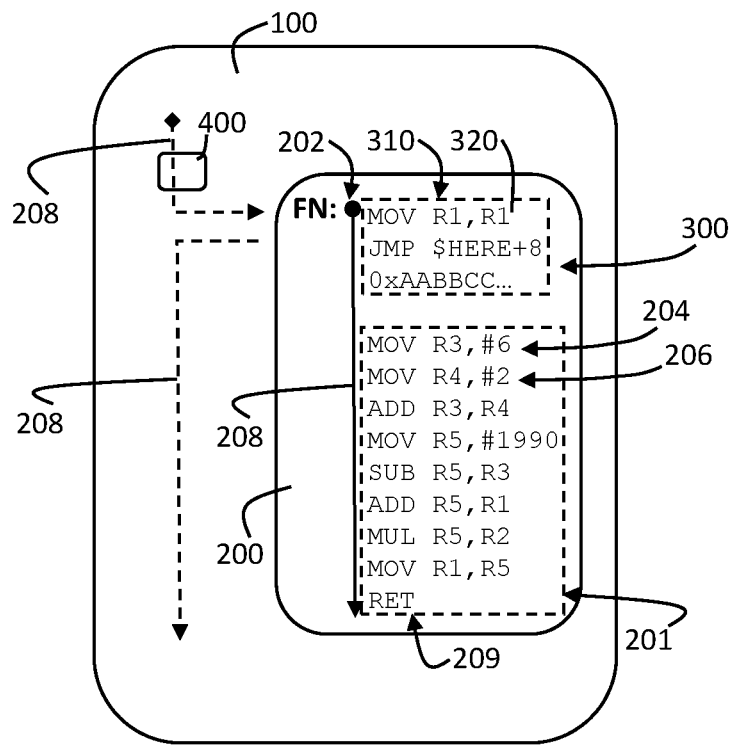

It is clear that still further embodiments are possible, such as for example the embodiment shown in FIG. 6, which shows an embodiment of a verification prologue 300 added to a function 200 "FN". According to the embodiment shown, the set 310 comprises a sequence of these three instructions:

"MOV R1, R1", which moves the value of register R1 to register R1;

"JMP $HERE+8", which adds an unconditional relative jump instruction 322 to jump eight bytes from the location of this instruction; and subsequently "0xAABBCC . . . ", four predetermined bytes 324.

Such an embodiment is clearly a combination of instructions similar as shown in the sets 310 of the embodiments of FIGS. 4 and 5. As shown, the first instruction is clearly an instruction without a semantic effect, and the second instruction is a jump instruction 322 which functions to jump across the inserted predetermined bytes of the third instruction 324.

As described above, with reference to the embodiments of FIG. 5 or 6, the predetermined bytes 324 of the verification prologue 300 could comprise one or more predetermined data, which could for example be used by the corresponding verification prologue check 400 to check the integrity of the corresponding verification prologue 300 at run time. However, it is clear that alternative embodiments are possible in which the predetermined bytes 324 comprise for example one or more random bytes or one or more invalid instructions. According to such embodiments, when for example, similar as explained above with reference to FIG. 1, the verification prologue 300 would be compromised, for example by overriding the jump instruction 322, with a different one, for example of a trampoline 212, this would potentially change the control flow 208 of the function in such a way that the predetermined bytes 324, which comprise random bytes, or invalid instructions, etc. are no longer skipped, thereby leading to the failure of the execution of the software application 100. It is clear that still further alternative embodiments are possible, as long as in general the verification prologue 300 consists of a predetermined non-empty set 310 of instructions 320 configured such that, when the set 310 is not executed in its entirety, the execution of the software application 100 fails. It is clear that execution of the set 310 in its entirety means execution of the original sequence of instructions 320 of the set 310 as inserted at build time, without insertion or removal of other instructions.

It is further clear that instead of failure of the execution of the software application when the set 310 of the verification prologue as inserted at build time is not executed in its entirety, according to alternative embodiments, the execution of the software application 100 could be aborted, continued in an erroneous way, trigger the execution of a predetermined integrity breach function of the software application 100, etc. Such an integrity breach function could for example comprise a user defined function which comprises suitable instructions for handling a detected breach of integrity of the software application after distribution.

Figure 9:
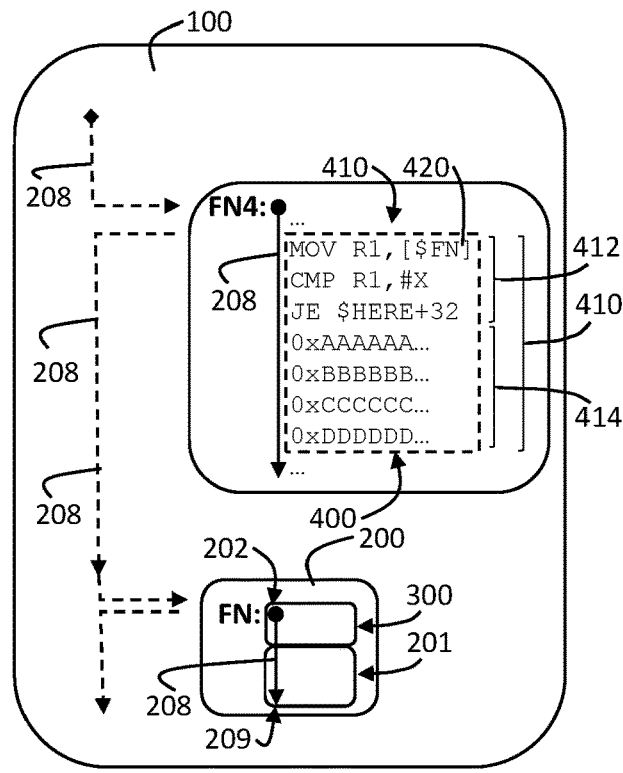

FIG. 9 shows still a further embodiment of a verification prologue check 400, which is added to a function of the software application 100 labelled "FN4". As shown, similar as the embodiment of FIG. 7 it will compare at least a part of the corresponding verification prologue check 300 with a predetermined value #X inserted at build time. A jump instruction "JE $HERE+32" will then jump across a set 414 of four invalid instructions if there is a match which indicates that the integrity check has succeeded. However, if the integrity check fails, the control flow 208 will proceed to the invalid instruction "0xAAAA . . . ", which will cause the software application to crash. In this way the first three instructions of the verification prologue check 400 thus provide for an integrity check by means of opaque predicates 412 which comprises a predetermined evaluation of at least a part of the corresponding verification prologue 300.

It is clear that still further alternative embodiments are possible, for example the verification prologue check 400 could be configured to perform the integrity check by comparing a predetermined checksum of the inserted verification prologue 300 at build time with a checksum of the verification prologue 300 as calculated during execution, instead of or in addition to a direct comparison of at least a part of the verification prologue 300 at build time and at run time. As the verification prologue 300 comprises a more limited set of instructions than the function 200 to which it was added, such a checksum can be calculated efficiently, and has a reduced impact during build time and run time of the software application 100.

It is further clear that as explained above, during execution of the software application 100, the verification prologue check 400 is configured to continue the execution of the software application 100 upon a successful integrity check. When the integrity check fails, as explained above, the execution of the software application could be aborted, or continued in such a way that it fails. However, it is clear that according to still further embodiments, a failing integrity check could for example lead to a continued execution of the software application 100, but in an erroneous way, for example leading to erroneous results or behaviour, or trigger the execution of a predetermined integrity breach function of the software application 100, etc.

Figure 10:
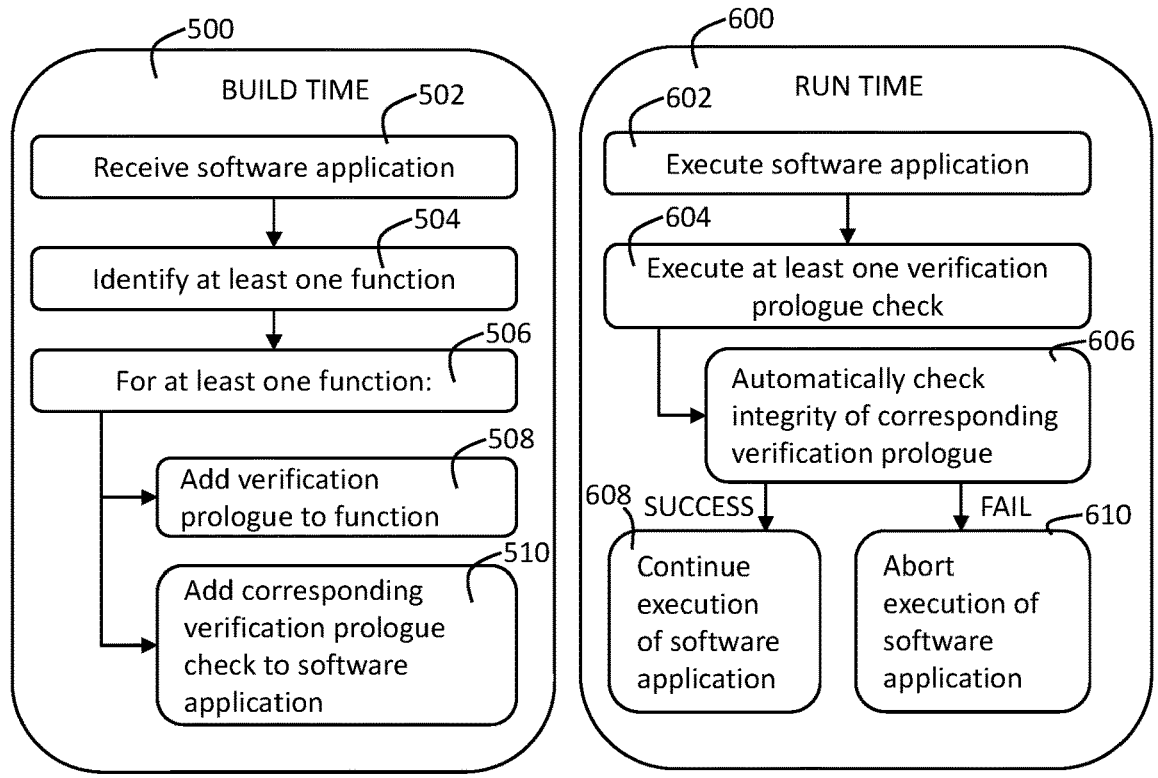
FIG. 10 schematically shows an embodiment of a computer-implemented method for operating the automated application verification module.

FIG. 10 schematically shows an embodiment of a computer-implemented method for operating the automated application verification module 10, similar as described above. As shown, the computer-implemented method, for example during build time 500, receives the software application 100 at step 502. Subsequently at step 504 identifies one or more functions 200 of the software application 100. Then the method proceeds to step 506, where for at least one of the identified functions 200 the steps 508 and 510 are initiated. It is clear that preferably a plurality of identified functions 200 are each respectively subjected to the operations of the steps 508 and 510. At step 508 there is added a verification prologue 300 at the entry point 202 of the function 200 which does not alter the control flow of at least the original set 201 of instructions of the function 200 and/or does not alter the semantics of the function 200, when the verification prologue 300 is executed in its entirety. It is clear that, similar as described above, various alternative embodiments of such verification prologues 300 are possible. Preferably, when a plurality of identified functions 200 is subjected to the addition of a verification prologue 300 at the entry point 202 of the function 200, the respectively added verification prologues 300 are not identical, and preferably comprise various embodiments of the verification prologues 300 such that the risk for a detectable pattern is decreased. Further, as shown in FIG. 10, at step 510, for each added verification prologue, there is added at least one corresponding verification prologue check 400 to the software application 100. As already mentioned above, the verification prologue check 400 is in general added to the software application 100, such that the verification prologue check 400 is configured to automatically check the integrity of the corresponding verification prologue 300 during execution of the software application 100. As shown in FIG. 6, this means that during run time 600, when the software application 100, after distribution and potential tampering, is executed at step 602, at some suitable point in time at least one of the verification prologue checks 400 inserted at build time will be executed. As mentioned above, the verification prologue checks 400 are inserted during build time at any suitable point in the control flow 208 of the software application 100 such that during run time 600 of the software application 100 the verification prologue checks 400 will also be executed. Preferably, as shown in FIGS. 3 to 9, the verification prologue checks 400 are inserted in the control flow 208 of the software application 100 before the call to the function 200 comprising their corresponding verification prologue 300 as in this way execution of a function 200 of which the integrity is compromised can be prevented, however it is clear that alternative embodiments are possible, in which the verification prologue checks 400, could be inserted at any suitable other location in the control flow 208 of the software application 100. According to some embodiments, there are added a plurality of corresponding verification prologue checks 400 to the software application 100 for a single corresponding verification prologue 300. This allows to spread these different verification prologue checks 400 for the corresponding verification prologue 300 at different locations in the control flow 208 of the software application 100. As further shown in FIG. 10, when the verification prologue check 400 is executed at run time 600, at step 606 the verification prologue check 400 will automatically check the integrity of the corresponding verification prologue 300. As shown, according to this embodiment, upon a successful integrity check, the execution of the software application 100 will continue at step 608 and, upon a failing integrity check, the execution of the software application 100 will be aborted at step 610. It is clear that, similar as explained above, according to alternative embodiments, upon a failing integrity check, the verification prologue check 400 could be configured such that the execution of the software application 100 is continued in such a way that it fails, or is continued in an erroneous way, or such that the execution of a predetermined integrity breach function of the software application 100 is triggered.

It is clear that still further alternative embodiments are possible, more particularly the automated application verification module could for example be part of or coupled to a suitable build system, such that it can execute its automated application verification method before, during or in cooperation with at least a part of the build operation of the software application. It is further clear that the automated application verification module could for example be part of or coupled to software applications for use during a build operation, for example for optimizing, securing, . . . a software application. One example of such a known software application is for example known as ProGuard, available at http://proguard.sourceforge.net/. Proguard is a known software application for use during a build operation, which for example reduces the size of the software application by making use of for example identification of functions of the software application, for example during compilation. An alternative known software application for use during the build operation is DexGuard available at http://www.guardsquare.com/dexguard. Dexguard focuses on the protection of mobile software applications, with additional features such as for example resource obfuscation, string encryption, class encryption, and executable application file splitting. DexGuard is focussed on Android applications and directly creates Dalvik bytecode during the Android build operation in which Android programs are compiled into .dex or Dalvik Executable files, which are in turn packaged into a software package or .apk file. Such known software applications, during the build operation, make use of for example identification of functions to reduce the size and increase the efficiency of the software application. Still a further alternative known software application is known as iXGuard available at https://www.guardsquare.com/ixguard and provides similar functionality for software applications for the iOS operating system. It is clear that, the functionality of this identification of function of the software application as already available in these such existing software applications which are aimed at detecting for example unused functions or other application components, can according to particular embodiments be made available in a shared or integrated way to the automated application verification module during build time. In this way, the automated application verification module could thus for example be easily integrated with such abovementioned software applications such as ProGuard, DexGuard, etc.

Figure 11:
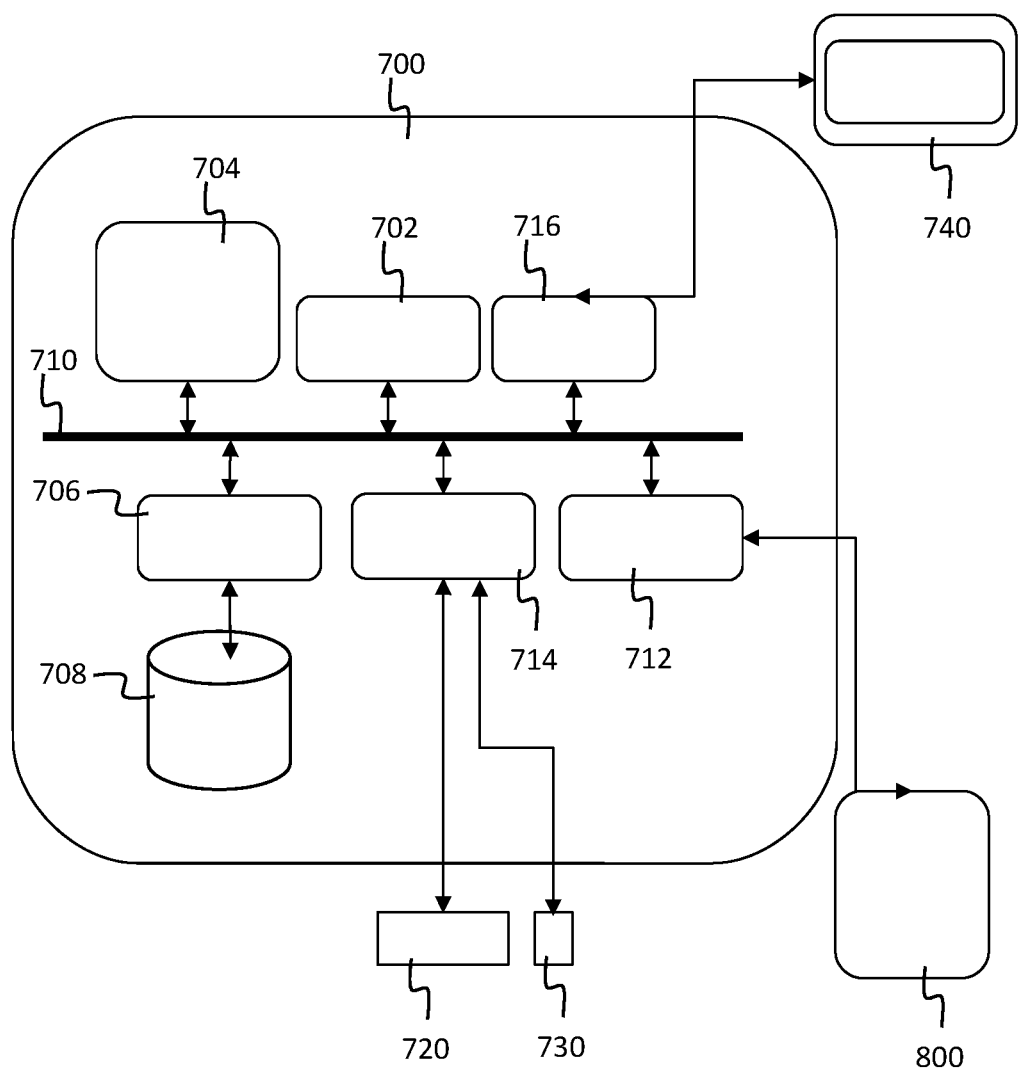
FIG. 11 schematically shows a suitable computing system for executing the computer-implemented method.

FIG. 11 schematically shows a suitable computing system 700, 800 for executing the computer-implemented method described above. FIG. 11 thus shows shows a suitable computing system 700, 800 for hosting the automated application verification module 10 or any of its components as described with reference to the above-mentioned embodiments. Computing system 700 may in general be formed as a suitable general-purpose computer and comprise a bus 710, a processor 702, a local memory 704, one or more optional input interfaces 714, one or more optional output interfaces 716, a communication interface 712, a storage element interface 706 and one or more storage elements 708. Bus 710 may comprise one or more conductors that permit communication among the components of the computing system. Processor 702 may include any type of conventional processor or microprocessor that interprets and executes programming instructions. Local memory 704 may include a random access memory (RAM) or another type of dynamic storage device that stores information and instructions for execution by processor 702 and/or a read only memory (ROM) or another type of static storage device that stores static information and instructions for use by processor 702. Input interface 714 may comprise one or more conventional mechanisms that permit an operator to input information to the computing device 700, such as a keyboard 720, a mouse 730, a pen, voice recognition and/or biometric mechanisms, etc. Output interface 716 may comprise one or more conventional mechanisms that output information to the operator, such as a display 740, a printer, a speaker, etc. Communication interface 712 may comprise one or more transceiver-like mechanisms such as for example two 1 Gb Ethernet interfaces that enables computing system 700 to communicate with other devices and/or systems, for example mechanisms for communicating with one or more other computing systems 800. The communication interface 712 of computing system 700 may be connected to such another computing system 800 by means of a local area network (LAN) or a wide area network (WAN), such as for example the internet. Storage element interface 706 may comprise a storage interface such as for example a Serial Advanced Technology Attachment (SATA) interface or a Small Computer System Interface (SCSI) for connecting bus 710 to one or more storage elements 708, such as one or more local disks, for example 1 TB SATA disk drives, and control the reading and writing of data to and/or from these storage elements 708. Although the storage elements 708 above is described as a local disk, in general any other suitable computer-readable media such as a removable magnetic disk, optical storage media such as a CD or DVD, -ROM disk, solid state drives, flash memory cards, . . . could be used.

The automated application verification module 10 according to the above-mentioned embodiments could be part of a suitable build automation utility running on a computing system 700 locally available to a developer, such as a personal computer, laptop, etc. or on a remotely accessible computing system such as one or more servers available to a plurality of application developers. Alternatively, the automated application verification module 10 may also be part of build automation servers, for example comprising web based build tools, which execute build automation utilities on a scheduled or triggered basis, such as for example a continuous integration server. It is clear that the automated application verification module 10, etc. and their associated computer-implemented method of operation, can be implemented as programming instructions stored in the local memory 704 of the computing system 700 for execution by its processor 702. Alternatively, these components could be stored on the storage element 708 or be accessible from another computing system 800 through the communication interface 712. In general, in this way the automated application verification module 10 and the associated computer-implemented method are provided as a computer program comprising software code adapted to perform this computer-implemented method when executed by a computing system. Alternatively, the automated application verification module 10 and the associated computer-implemented method could also be provided as a computer readable storage medium comprising computer-executable instructions which, when executed by a computing system, perform the computer-implemented method.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein. This is especially the case for the embodiments described above which refer to a single build tool plugin and/or a single application component. It is clear that these embodiments are disclosed in a manner sufficiently clear and complete for a skilled person to apply that teaching to embodiments making use of two or more build tool plugins for processing a plurality of application components.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. One or more hardware storage devices having stored thereon computer-executable instructions that are executable by a computer system to cause an automated application verification module to:
   receive a software application;
   identify one or more functions of the software application;
   for at least one of the identified functions:
   in which the identified function consists of an original set comprising one or more instructions;
      add a verification prologue at the entry point of the function which does not alter the control flow of the original set of the function when the verification prologue is executed in its entirety; and
      add at least one corresponding verification prologue check to the software application, such that the verification prologue check is configured to automatically check the integrity of the corresponding verification prologue during execution of the software application.

2. The one or more hardware storage devices according to claim 1, wherein the verification prologue consists of a predetermined, non-empty set comprising instructions configured such that, when the set is executed in its entirety, the control flow of the original set of the function is not altered.

3. The one or more hardware storage devices according to claim 1, wherein the verification prologue consists of a predetermined, non-empty set comprising instructions configured such that, when the set is executed in its entirety, the set has no semantic effect on the function.

4. The one or more hardware storage devices according to claim 1, wherein the verification prologue consists of a predetermined, non-empty set comprising one or more no operation or NOP instructions.

5. The one or more hardware storage devices according to claim 1, wherein the verification prologue consists of a predetermined, non-empty set comprising instructions configured such that, when the set is executed with modifications and/or not in its entirety:
   the execution of the software application is aborted;
   the execution of the software application fails;
   the execution of the software application continues in an erroneous way; and/or
   the execution of a predetermined integrity breach function of the software application is triggered.

6. The one or more hardware storage devices according to claim 1, wherein the verification prologue consists of a predetermined set comprising one or more predetermined bytes, prefixed by a predetermined jump instruction configured to jump across these predetermined bytes when executed.

7. The one or more hardware storage devices according to claim 6, wherein the one or more predetermined bytes comprise one or more of the following:
- one or more predetermined data;
- one or more random bytes;
- one or more invalid instructions.

8. The one or more hardware storage devices according to claim 1, wherein the verification prologue check is configured to:
- upon a successful integrity check: continue the execution of the software application; and
- upon a failing integrity check:
  - abort the execution of the software application;
  - continue the execution of the software application such that it fails;
  - continue the execution of the software application in an erroneous way; and/or
  - trigger the execution of a predetermined integrity breach function of the software application.

9. The one or more hardware storage devices according to claim 1, wherein the verification prologue check is configured to check the integrity by comparing at least a predetermined part of the verification prologue of the function as inserted at build time with the corresponding part of the function at run time.

10. The one or more hardware storage devices according to claim 1, wherein the verification prologue check is configured to check the integrity by comparing a predetermined checksum of the inserted verification prologue at build time with a checksum of the verification prologue as calculated during execution.

11. The one or more hardware storage devices according to claim 1, wherein the verification prologue check is configured to check the integrity by means of a decryption function in which at least part of the corresponding verification prologue is used as decryption key.

12. The one or more hardware storage devices according to claim 1, wherein the verification prologue check is configured to check the integrity by means of one or more opaque predicates which comprises a predetermined evaluation of at least a part of the corresponding verification prologue.

13. A computer-implemented method of operating an automated application verification module, the method comprising:
- receiving a software application;
- identifying one or more functions of the software application;
- for at least one of the identified functions:
  - in which the identified function consists of an original set comprising one or more instructions;
  - adding a verification prologue at the entry point of the function which does not alter the control flow of the original set of the function when the verification prologue is executed in its entirety; and
  - adding at least one corresponding verification prologue check to the software application, such that the verification prologue check is configured to automatically check the integrity of the corresponding verification prologue during execution of the software application.

14. The method according to claim 13, wherein the verification prologue consists of a predetermined, non-empty set comprising instructions configured such that, when the set is executed in its entirety, the control flow of the original set of the function is not altered.

15. The method according to claim 13, wherein the verification prologue consists of a predetermined, non-empty set comprising instructions configured such that, when the set is executed in its entirety, the set has no semantic effect on the function.

16. The method according to claim 13, wherein the verification prologue consists of a predetermined, non-empty set comprising one or more no operation or NOP instructions.

17. The method according to claim 13, wherein the verification prologue consists of a predetermined, non-empty set comprising instructions configured such that, when the set is executed with modifications and/or not in its entirety:
- the execution of the software application is aborted;
- the execution of the software application fails;
- the execution of the software application continues in an erroneous way; and/or
- the execution of a predetermined integrity breach function of the software application is triggered.

18. The method according to claim 13, wherein the verification prologue consists of a predetermined set comprising one or more predetermined bytes, prefixed by a predetermined jump instruction configured to jump across these predetermined bytes when executed.

19. The method according to claim 18, wherein the one or more predetermined bytes comprise one or more of the following:
- one or more predetermined data;
- one or more random bytes;
- one or more invalid instructions.

20. The method according to claim 13, wherein the verification prologue check is configured to:
- upon a successful integrity check: continue the execution of the software application; and
- upon a failing integrity check:
  - abort the execution of the software application;
  - continue the execution of the software application such that it fails;
  - continue the execution of the software application in an erroneous way; and/or
  - trigger the execution of a predetermined integrity breach function of the software application.

* * * * *